UNITED STATES PATENT OFFICE.

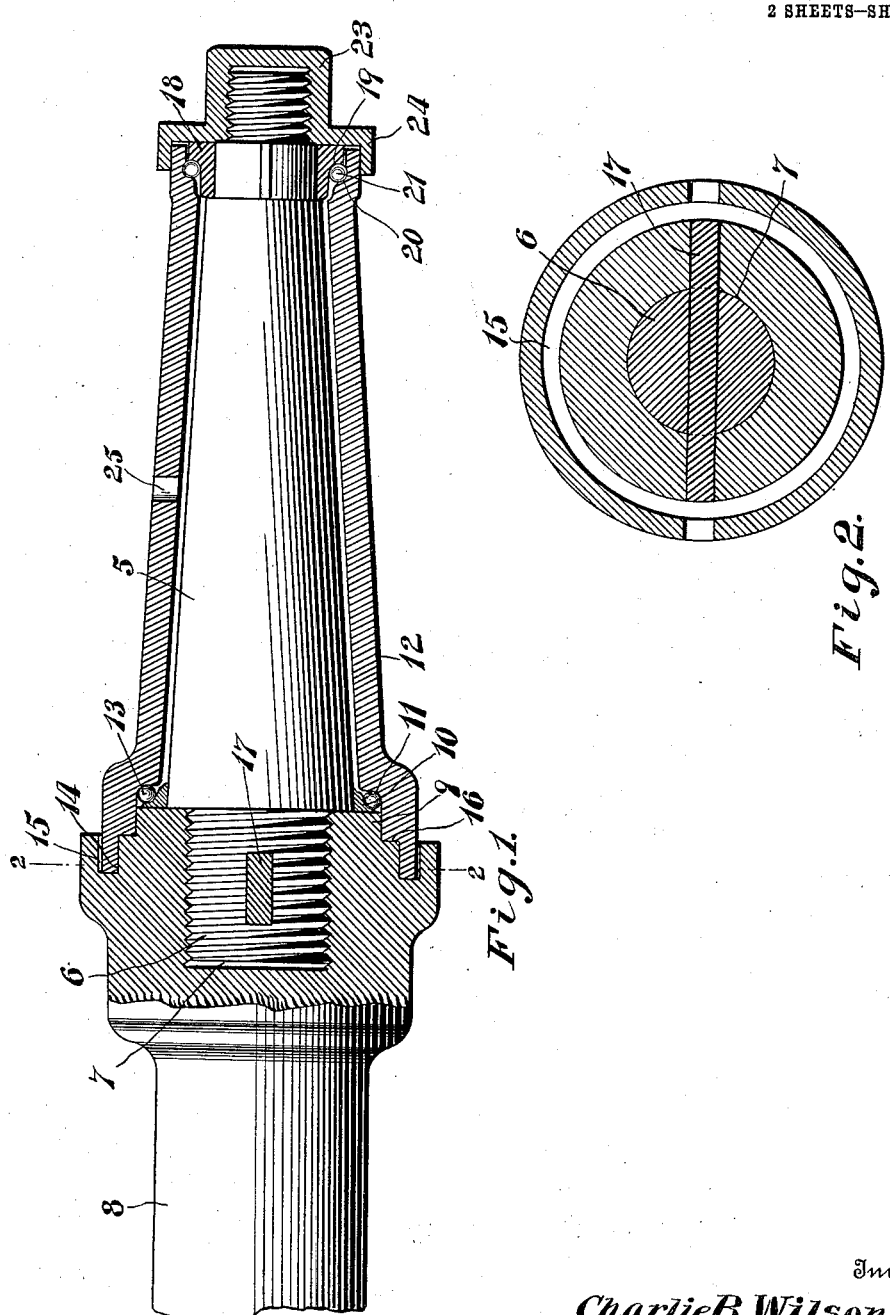

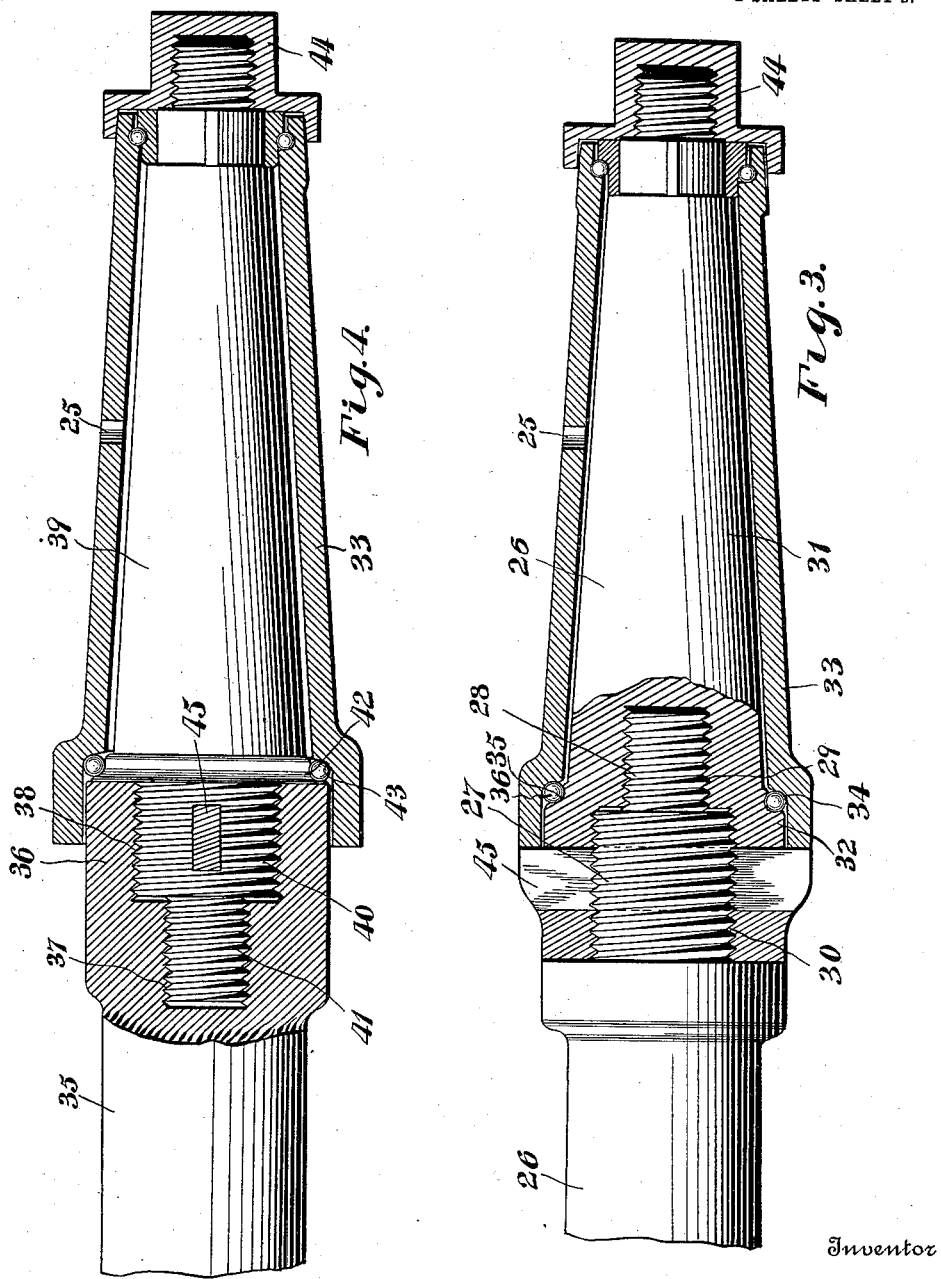

CHARLES B. WILSON, OF BARTOW, FLORIDA, ASSIGNOR TO JASPER SUMERLIN, OF BARTOW, FLORIDA.

DETACHABLE SPINDLE.

1,028,090. Specification of Letters Patent. Patented May 28, 1912.

Application filed June 17, 1911. Serial No. 633,776.

*To all whom it may concern:*

Be it known that I, CHARLES B. WILSON, citizen of the United States, residing at Bartow, in the county of Polk and State of Florida, have invented new and useful Improvements in Detachable Spindles, of which the following is a specification.

The general object of the invention is to increase the efficiency of vehicle wheel mounts such as shown in my previous Patent No. 978,096, of December 6, 1910. In that patent I have shown a spindle having a socketed end portion adapted to receive the ribbed end portion of an axle and further having elongated prongs which straddle the end portion of the axle and which are secured to the lower side thereof and between the bolster by means of clips. In the said patent I have further shown a boxing rotatably mounted on the spindle and supported by ball bearings. The inner end of the boxing being uncovered so that dust readily enters the bearing. In the present instance I have provided a simpler means for connecting the spindle to the axle and also have provided means whereby dust will be positively prevented from entering the bearing of the spindle.

The above and other objects will appear and be better understood from the following description taken in connection with the accompanying drawings in which:

Figure 1 is a detail section of one end portion of an axle and spindle constructed in accordance with my invention; Fig. 2 is a cross section of the axle on line 2—2 of Fig. 1. Fig. 3 is a view similar to Fig. 1 but showing a modified form of device; Fig. 4 is a view similar to Fig. 3 but showing another modification.

For purpose of illustration I have shown only one portion of the axle. It must be understood however that the construction hereinafter described as applied to the end of the axle shown will also be present with the opposite end of the axle.

In Fig. 1 the spindle 5 has at its inner end a reduced screw threaded boss 6 which screws into a centrally disposed socket 7 in the end of the axle 8. 9 indicates a circular shoulder at the end of the axle 8 and 10 indicates a grooved ring which coöperates with the concaved portion 11 on the box 12 to provide a race for the bearing balls 13. The inner end of the box 12 is reduced in thickness by a counter-bore 14 this reduced end being harbored in a circular groove 15 concentric with the socket 10. The shoulder 16 at the inner end of the counter-bore 14 bears on the end surface of the axle whereby dust is prevented from entering the ball bearing. In order to prevent accidental turning of the spindle a key 17 is provided which enters alining lateral openings formed in the axle and boss 6. The key, as herein shown corresponds in length approximately to the diameter of the circular shoulder 10 so that it is housed by the inner end portion of the box 12 whereby accidental displacement thereof will be prevented. A cup 18 is arranged on the outer end of the spindle 11 and has a grooved shoulder 19 which coöperates with a grooved shoulder 20 at the outer end of the box 12 to provide a race for the bearing balls 21. The outer end portion of the spindle is reduced so as to provide a boss 22 which is exteriorly screw-threaded and receives a nut 23 having an annular flange 24, which surrounds the outer end of the box and prevents the entrance of dust to the ball bearing. With this construction it will be seen that an extremely efficient dust proof bearing is provided and at the same time the spindle may be readily detached from the axle whenever desired. An opening 25 is formed in the box and communicates with the space between the latter and spindle and provides a means whereby oil may be directed into the said space and be retained therein by virtue of the construction previously described.

In the modified form illustrated in Fig. 3 the axle 26 has a reduced screw-threaded boss 27 which terminates in a further reduced screw-threaded boss 28, the screw-threads of these bosses engaging with the screw-threaded bore 29 and counter-bore 30 at the inner end of the spindle 31. The spindle 31 is herein shown as provided with a circular shoulder 32 which is received by the inner end of the box 33, the said box having a grooved portion 34 which coöperates with a similar grooved shoulder 35 to provide a ball race for the bearing balls 36, the outer end portion of the spindle being shaped as described for Fig. 1 and receiving a nut similar to the nut 23.

In the modified form illustrated in Fig. 4 the axle 35 is enlarged as shown at 36 and has a screw-threaded bore 37 and a screw-threaded counter-bore 38. The spindle 39 has an enlarged screw-threaded portion 40 the threads of which engage with the threads of the counter-bore 38 and a reduced screw-threaded boss 41, the threads of which engage with the threads of the bore 37. The box 33 has a concaved shoulder 42 which coöperates with a similar shoulder 43 on the spindle 39 to provide a ball race; the inner end of the box surrounds the enlarged portion 36, and the outer end of the box and spindle are constructed as previously described for Fig. 1 and secured by the nut 44.

In Figs. 3 and 4 the spindle is secured in both instances by means of a key 45 extending through a lateral opening in the spindle and axle.

Although I have shown a preferred and modified form of the device it is to be understood that I am not to be limited to the structure or arrangement of parts herein shown, since it will be manifest that various changes may be made in the scope of the appended claim without departing from the spirit or sacrificing any advantages of the invention.

What is claimed as new is:

In combination, an axle having circular grooves in the ends thereof, spindles connected to the axle, keys passing through the spindles and axle, rotatable boxings on the spindles having their inner ends extending into the said grooves and surrounding said keys, and nuts screwed onto the spindle having portions surrounding the outer ends of the boxings.

In testimony whereof I affix my signature in presence of two witnesses.

CHARLIE B. WILSON.

Witnesses:
H. K. OLLIPHANT,
H. K. OLLIPHANT, Jr.

Copies of this patent may be obtained for five cents each, by addressing the "Commissioner of Patents, Washington, D. C."